(12) United States Patent
Wang et al.

(10) Patent No.: US 8,615,264 B2
(45) Date of Patent: Dec. 24, 2013

(54) METHOD AND APPARATUS FOR ALLOCATING COGNITIVE RADIO NETWORK SPECTRUM BASED ON AGGREGATION

(75) Inventors: Jiao Wang, Beijing (CN); Gong Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/480,899

(22) Filed: May 25, 2012

(65) Prior Publication Data

US 2012/0289272 A1    Nov. 15, 2012

Related U.S. Application Data

(63) Continuation of application No. PCT/CN2010/079043, filed on Nov. 24, 2010.

(30) Foreign Application Priority Data

Mar. 8, 2010    (CN) .......................... 2010 1 0120533

(51) Int. Cl.
*H04W 72/04*    (2009.01)

(52) U.S. Cl.
USPC ........... 455/509; 455/434; 455/450; 455/454; 455/455; 455/464; 455/516; 455/158.1; 455/185.1; 455/34.2

(58) Field of Classification Search
None
See application file for complete search history.

(56) References Cited

U.S. PATENT DOCUMENTS

| | | | |
|---|---|---|---|
| 7,627,326 B1 | 12/2009 | Miller | |
| 2008/0059898 A1 | 3/2008 | Deggelmann et al. | |
| 2009/0196180 A1* | 8/2009 | Bahl et al. ..................... | 370/235 |
| 2009/0207800 A1 | 8/2009 | Shan et al. | |
| 2009/0298439 A1 | 12/2009 | Choi et al. | |
| 2011/0134968 A1* | 6/2011 | Han et al. ..................... | 375/146 |

FOREIGN PATENT DOCUMENTS

| | | |
|---|---|---|
| CN | 1878027 | 12/2006 |
| CN | 101359930 | 4/2009 |
| CN | 101588213 | 11/2009 |
| CN | 101626604 | 1/2010 |
| CN | 101662321 | 3/2010 |
| WO | 2008/144323 | 11/2008 |

OTHER PUBLICATIONS

International Search Report mailed Apr. 7, 2011 issued in corresponding International Patent Application No. PCT/CN2011/07008.

(Continued)

*Primary Examiner* — Yuwen Pan
*Assistant Examiner* — Fanghwa Wang
(74) *Attorney, Agent, or Firm* — Staas & Halsey LLP

(57) ABSTRACT

A method and an apparatus for allocating a cognitive radio network spectrum based on aggregation. The method includes: obtaining information about unoccupied spectrum fragments and unit capacity information of a secondary users on different spectrum fragments, and constructing a solution matrix; calculating a reference index corresponding to the solution matrix, determining a resource allocation vector according to the reference index, and allocating resources after selecting a resource allocation element from the resource allocation vector; and removing a resource allocation element that is used in the resource allocation from the solution matrix, and then constructing a new solution matrix to continue allocating resources until unoccupied spectrum resources corresponding to the information about unoccupied spectrum fragments are allocated completely.

8 Claims, 5 Drawing Sheets

(56) References Cited

OTHER PUBLICATIONS

International Search Report of Corresponding PCT Application PCT/CN2010/079043 mailed Mar. 3, 2011.

Juncheng Jia et al., "Hardware-constrained Multi-Channel Cognitive MAC", Global Telecommunications Conference, Nov. 2007, pp. 4653-4658.

M.E. Steenstrup, "Opportunistic Use of Radio-Frequency Spectrum: A Network Perspective", 2005 1st IEEE International Symposium on New Frontiers in Dynamic Spectrum Access Networks, Nov. 2005, pp. 638-641.

Extended European Search Report dated Jul. 5, 2012 issued in corresponding European Patent Application No. 10847290.3.

English Translation of the Written Opinion mailed Mar. 3, 2011 in corresponding International Patent Application No. PCT/CN2010/079043 (4 Pages).

First Chinese Office Action mailed Feb. 22, 2013 in corresponding Chinese Patent Application No. 2010101205335 (2 pages).

* cited by examiner

|   | | $X_1$ | $X_2$ | $X_3$ | | $X_j$ | | $X_n$ | Requirement |
|---|---|---|---|---|---|---|---|---|---|
|   | | Fragment 1 | Fragment 2 | Fragment 3 | …… | Fragment j | …… | Fragment n | |
| $y_1$ | User 1 | a11 $C_{11}$ | a12 $C_{12}$ | a13 $C_{13}$ | …… | a1j $C_{1j}$ | …… | a1n $C_{1n}$ | r1 |
| $y_2$ | User 2 | a21 $C_{21}$ | a22 $C_{22}$ | a23 $C_{23}$ | …… | a2j $C_{2j}$ | …… | a2n $C_{2n}$ | r2 |
|   | …… | | …… | | | …… | | | |
| $y_i$ | User i | ai1 $C_{i1}$ | ai2 $C_{i2}$ | ai3 $C_{i3}$ | …… | aij $C_{ij}$ | …… | ain $C_{in}$ | ri |
|   | …… | | …… | | | | | | |
| $y_m$ | User m | am1 $C_{m1}$ | am2 $C_{m2}$ | am3 $C_{m3}$ | …… | amj $C_{mj}$ | …… | amn $C_{mn}$ | rm |
|   | Supply | $S_1$ | $S_2$ | $S_3$ | …… | $S_j$ | …… | $S_n$ | sum |

FIG. 6 ent application is a continuation of International Application No. PCT/CN2010/079043, filed on Nov. 24, 2010, which claims priority to Chinese Patent Application No. 201010120533.5, filed on Mar. 8, 2010, both of which are hereby incorporated by reference in their entireties.

METHOD AND APPARATUS FOR ALLOCATING COGNITIVE RADIO NETWORK SPECTRUM BASED ON AGGREGATION

CROSS-REFERENCE TO RELATED APPLICATIONS

This application is a continuation of International Application No. PCT/CN2010/079043, filed on Nov. 24, 2010, which claims priority to Chinese Patent Application No. 201010120533.5, filed on Mar. 8, 2010, both of which are hereby incorporated by reference in their entireties.

FIELD OF THE INVENTION

The present invention relates to the cognitive radio (Cognitive Radio, CR) field, and in particular, to a method and an apparatus for allocating a cognitive radio network spectrum based on aggregation.

BACKGROUND OF THE INVENTION

A cognitive radio technology is a technology that allows an unauthorized user (Secondary User, SU) to perform communication by using, in the network coverage of an authorized user (Primary User, PU) under particular policy permissions and through a particular negotiation relationship, spectrum resources that the PU does not occupy temporarily. In a cognitive radio network (Cognitive Radio Network, CRN), the secondary user performs spectrum scanning to search for a spectrum that is not occupied by the primary user, and performs communication by using a frequency band in a particular allocation manner.

However, in a process of sensing an unoccupied spectrum, it is found that idle spectrums of the PU are generally distributed in a discontinuous state. How to use these discontinuous spectrum fragments to satisfy an actual requirement of radio network transmission is a problem that should be overcome in the cognitive radio field. A fine granularity measurement on a spectrum usage condition of an operator in China shows that a usage condition of each frequency band still varies greatly and that idle frequency bands are still distributed discontinuously in a particular time segment.

A spectrum aggregation technology may effectively solve a problem exists between a spectrum requirement and a radio access service. The spectrum aggregation technology is to extend multiple discrete spectrum fragments to a usable transmission carrier and apply the transmission carrier in a service with a higher bandwidth requirement when resources are in short supply. The spectrum aggregation technology may be used in a same frequency band or in different frequency bands. The use of the spectrum aggregation technology has the following advantages: A physical channel and a modulation and coding scheme do not need to be re-designed; an adverse impact on the system physical channel and the modulation and coding scheme are reduced; and a difficulty designing a communication system is reduced. In addition, the spectrum aggregation technology also has an obvious advantage in a feasibility study on a spectrum of a TV frequency band.

In the process of implementing the present invention, the inventor discovers that the prior art has at least the following problems: In the prior art, a multi-user spectrum allocation algorithm adopts a solution of an iteration-based Nash Bargaining method; however, this solution defines incomplete constraints, and cannot completely solve a problem in an actual scenario; in addition, the Nash Bargaining algorithm features a complex and difficult solving process, thereby failing to meet current requirements for effectively utilizing discrete spectrum fragments in the network of the primary user and supporting a service of the secondary user having a particular requirement for a bandwidth in the cognitive radio network.

SUMMARY OF THE INVENTION

Embodiments of the present invention provide a method and an apparatus for allocating a cognitive radio network spectrum based on aggregation to effectively utilize discrete spectrum fragments in a network of a primary user and support a service of a secondary user having a particular requirement for a bandwidth in a cognitive radio network.

In one aspect, an embodiment of the present invention provides a method for allocating a cognitive radio network spectrum based on aggregation, where the method includes: obtaining information about unoccupied spectrum fragments and unit capacity information of secondary users on different spectrum fragments, and constructing a solution matrix; calculating a reference index corresponding to the solution matrix, determining a resource allocation vector according to the reference index, and allocating resources after selecting a resource allocation element from the resource allocation vector; and if there is a remaining resource allocation element waiting for resource allocation after the resource allocation, removing the resource allocation element that is used in the resource allocation from the solution matrix, and then constructing a new solution matrix to continue allocating resources until unoccupied spectrum resources corresponding to the information about unoccupied spectrum fragments are allocated completely or the all secondary users waiting for resource allocation obtain required spectrum resources.

In another aspect, an embodiment of the present invention provides an apparatus for allocation a cognitive radio network spectrum based on aggregation, where the apparatus includes: a matrix constructing unit, configured to obtain information about unoccupied spectrum fragments and unit capacity information of secondary users on different spectrum fragments, and construct a solution matrix; and a resource allocating unit, configured to calculate a reference index corresponding to the solution matrix, determine a resource allocation vector according to the reference index, and allocate resources after selecting a resource allocation element from the resource allocation vector; and if there is a remaining resource allocation element waiting for resource allocation after the resource allocating unit allocates resources, remove a resource allocation element that is used in the resource allocation from the solution matrix, and then construct a new solution matrix to continue allocating resources until unoccupied spectrum resources corresponding to the information of unoccupied spectrum fragments are allocated completely or all secondary users waiting for resource allocation obtain required spectrum resources.

The preceding technical solutions have the following beneficial effects: Because a technical means of effectively utilizing discrete spectrum fragments in a network of a primary user is adopted, the total capacity of a cognitive radio network system is maximized on the basis that the number of spectrum fragments is minimized, which may compensate for a defect of high complexity of an original spectrum allocation solution and thereby support a service of a secondary user have a particular requirement for a bandwidth in the cognitive radio network.

BRIEF DESCRIPTION OF THE DRAWINGS

FIG. 6 is a schematic diagram of a constructed solution matrix according to an embodiment of the present invention;

DETAILED DESCRIPTION OF THE EMBODIMENTS

The technical solutions of embodiments of the present invention are described clearly and completely below with reference to the accompanying drawings. Apparently, the embodiments described below illustrate a part rather than all of the embodiments of the present invention. All other embodiments that persons of ordinary skill in the art derive from the embodiments in the present invention without creative efforts fall with the protection scope of the present invention.

Figure 1A:
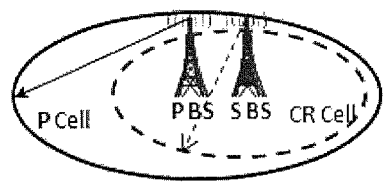
FIG. 1a is a schematic diagram of a scenario where a cognitive radio network cell is in a primary user cell according to an embodiment of the present invention.
Figure 1B:
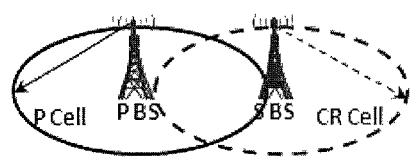
FIG. 1b is a schematic diagram of a scenario where a cognitive radio network cell is partially the same as a primary user cell according to an embodiment of the present invention.
Figure 1C:
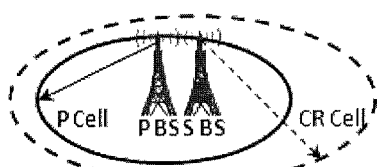
FIG. 1c is a schematic diagram of a scenario where a primary user cell is in a cognitive radio network cell according to an embodiment of the present invention.

Coverage relationships between a cognitive radio network cell (CR Cell) and a primary user cell (P Cell) are shown in scenarios in FIG. 1a, FIG. 1b, and FIG. 1c. FIG. 1a is a schematic diagram of a scenario where a cognitive radio network cell is in a primary user cell according to an embodiment of the present invention. FIG. 1b is a schematic diagram of a scenario where a cognitive radio network cell is partially the same as a primary user cell according to an embodiment of the present invention. FIG. 1c is a schematic diagram of a scenario where a primary user cell is in a cognitive radio network cell according to an embodiment of the present invention. A PBS refers to a base station (BS) of the primary user cell, and an SBS refers to a BS of a secondary user cell.

In the coverage of a CR cell, impacts of different P Cells may be imposed. Therefore, a secondary user may use different spectra in different areas of a Cell.

A unit capacity (capacity) that the secondary user obtains on an unavailable channel (channel) in an SBS (the BS of the secondary user cell) cell is defined as 0.

Figure 2:
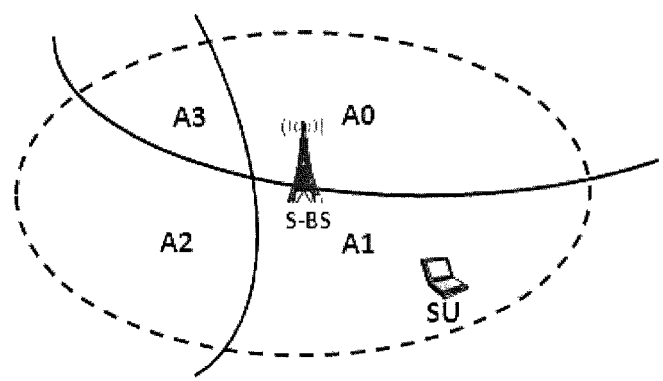
FIG. 2 is a schematic diagram of a definition of a study scenario according to an embodiment of the present invention.

It is defined that the power of the secondary user has the following constraint in the SBS cell:

$$P_i \leq P_i^{(m)},$$

where Pi (m) refers to the power of a primary user adjacent to a cognitive radio link. Therefore, a study scenario may be defined as shown in FIG. 2: In the CRN cell shown in FIG. 2, different areas are affected by nearby P Cells, and may use different spectra. The secondary user (SU) may obtain different unoccupied idle spectra in the SBS according to a location of the SU.

Figure 3:
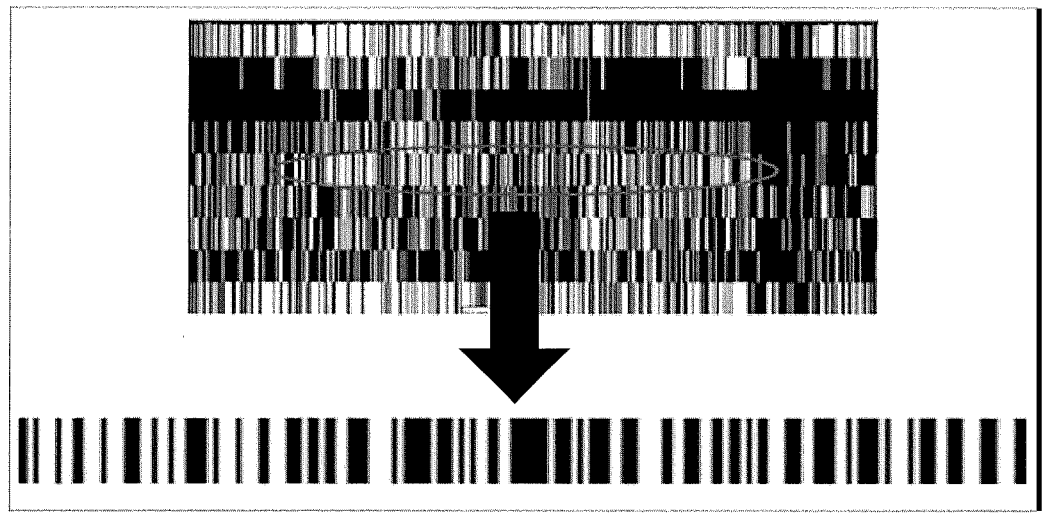
FIG. 3 is a schematic diagram of partial results of scanning performed on a spectrum usage condition in a current radio network.

According to a usage condition of spectrum resources in the current network, FIG. 3 shows partial results of scanning performed on a spectrum usage condition in the current radio network. In FIG. 3, the white blocks indicate idle spectra, and black blocks indicate occupied spectra.

As shown in FIG. 3, spectrum bandwidths in some white blocks are too small to support particular service requirements. Therefore, it is necessary to combine the part of spectrum fragments with other idle spectrum fragments on the basis of meeting a constraint condition and allocate these combined spectrum fragments to users by using a particular spectrum aggregation algorithm.

In the present invention, embodiments are described in the following scenarios:

1. The number of spectrum fragments that may be used by each user cannot exceed a predefined value.

2. The minimum available width of a spectrum fragment cannot be smaller than a predefined value.

3. If a user cannot be allocated a subcarrier in one frequency band, the number a of subcarriers is 0; otherwise, a value of a is the number of allocated subcarriers.

$$a_{ij} \geq 0 \forall i=1 \ldots n, j=1 \ldots m$$

4. Two cognitive radio links (CR links) cannot concurrently occupy the same subcarrier.

$$x_i^{(m)} + x_j^{(m)} \leq 1, \forall j \in I_j^{(m)}$$

5. The total number of subcarriers allocated to all users in a frequency band is equal to the total number of subcarriers that the frequency band is able to provide.

$$\sum_{i=1}^{m} a_{ij} = s_j \quad \forall j = 1, 2, \ldots, n$$

6. A capacity that a user obtains on all frequency bands is not smaller than a required capacity of the user (Service limitation).

$$\sum_{j=1}^{n} a_{ij} c_{ij} \geq r_i \quad \forall i = 1, 2, \ldots, m$$

Figure 4:
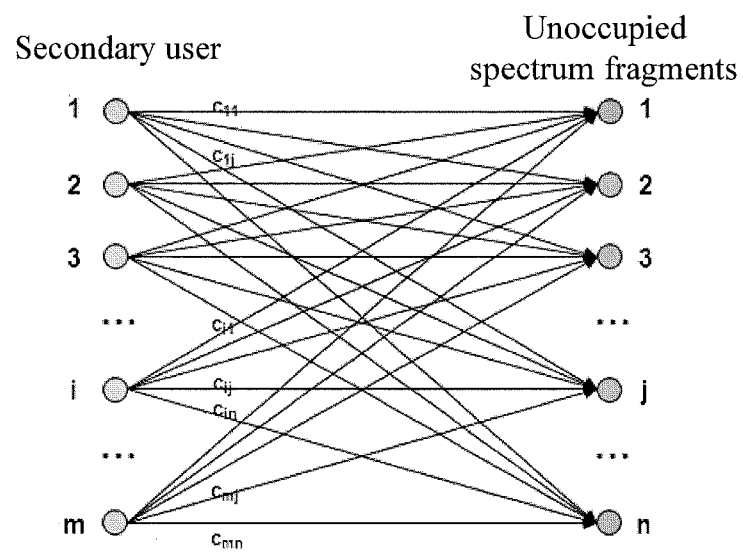
FIG. 4 is a schematic diagram of a network model of an aggregation-based spectrum allocation algorithm according to an embodiment of the present invention.

FIG. 4 is a schematic diagram of a network model of an aggregation-based spectrum allocation algorithm according to an embodiment of the present invention. A solution to allocating spectrum resources in a cognitive radio network to m secondary users in n unoccupied spectrum fragments is provided, that is, a method for allocating resources is sought. In a case that a minimum capacity requirement of each secondary user is satisfied, the total system capacity is maximized, that is:

$$\max C_{total} = \max \sum_{i=1}^{m} C_i$$

Because subcarriers in each frequency band provide each user with different unit capacities, a unit capacity ci generated when a spectrum fragment is allocated to a particular user may be used as a scale and a matrix formed by the ci may be regarded as a cost matrix to obtain a solution.

Figure 5:
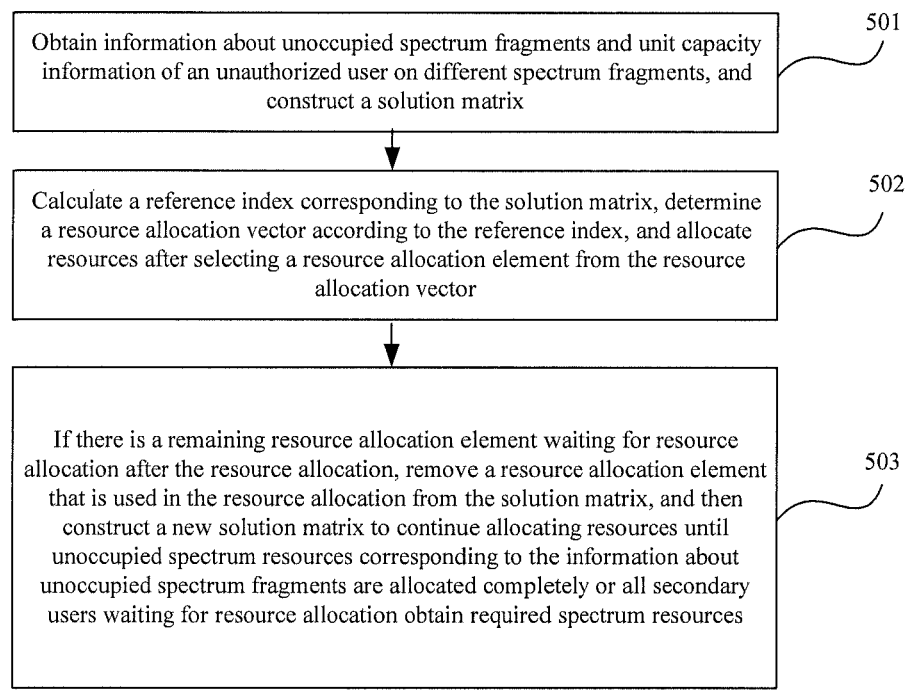
FIG. 5 is a flowchart of a method for allocating a cognitive radio network spectrum based on aggregation according to an embodiment of the present invention.

FIG. 5 is a flowchart of a method for allocating a cognitive radio network spectrum based on aggregation according to an embodiment of the present invention. The method includes the following steps:

501. Obtain information about unoccupied spectrum fragments and unit capacity information of a secondary user on different spectrum fragments, and construct a solution matrix.

S502. Calculate a reference index corresponding to the solution matrix, determine a resource allocation vector according to the reference index, and allocate resources after selecting a resource allocation element from the resource allocation vector.

503. If there is a remaining resource allocation element waiting for resource allocation after the resource allocation, remove a resource allocation element that is used in the resource allocation from the solution matrix, and then construct a new solution matrix to continue allocating resources until unoccupied spectrum resources corresponding to the information about unoccupied spectrum fragments are allocated completely or all secondary users waiting for resource allocation obtain required spectrum resources.

For example, FIG. 6 is a schematic diagram of a constructed solution matrix according to an embodiment of the present invention, where:

aij: indicates the number of subcarriers allocated to a user (user) i on a fragment (spectrum fragment) j;

cij: indicates the maximum capacity that is able to be provided when a single subcarrier in the fragment j is allocated to the user i;

ri: indicates the capacity required by the user i;

sj: indicates the number of subcarriers that the fragment j is able to provide;

sum: indicates the total number of unoccupied subcarriers; and xj, yi: indicates an element value of the reference index.

In a case that the number of spectrum fragments is minimized, an optimal allocation mode is sought to maximize the total capacity of the system.

Optionally, in step 502, the calculating the reference index corresponding to the solution matrix may include: calculating a first difference between two largest values of unit capacities that each secondary is able to obtain on all unoccupied spectrum fragments in the solution matrix; calculating a second difference between two largest values of unit capacities that each unoccupied spectrum fragment is able to provide to a secondary user waiting for resource allocation in the solution matrix; and using the first difference and the second difference as the reference index corresponding to the solution matrix.

For example, as shown in FIG. 6, two elements whose values are the largest in each row and each column in the matrix are selected, and a difference between the two elements is calculated to be used as a value in reference index X. Taking a column corresponding to fragment 2 as an example, assuming an element whose value is the largest is c22 and followed by ci2 in the column, an element x2 in a reference index corresponding to the column is x2=c22−ci2. Taking a row corresponding to the user i as an example, assuming an element whose value is the largest is ci3 and followed by ci5 in the row, an element yi in a reference index corresponding to the row is yi=ci3−ci5. The reference index X={x1, x2, ..., xn, y1, y2, ..., ym}.

Optionally, the determining the resource allocation vector according to the reference index may include: selecting a row or a column corresponding to an element whose value is the largest in the reference index, and using the row or the column as the current resource allocation vector.

For example, as shown in FIG. 6, an element whose value is the largest is selected from the reference index X, and a row or a column corresponding to the element is used as the current resource allocation vector. Assuming the element whose value is the largest in the reference index X is x2, the resource allocation vector is a column vector {c12, c22, ..., cm2} corresponding to fragment 2; assuming the element whose value is the largest in the reference index X is y3, the resource allocation vector is a row vector {c31, c32, ..., c3n} corresponding to user 3.

Optionally, the selecting a resource allocation element from the resource allocation vector may include the following: If a spectrum fragment includes n subcarriers, when all the n subcarriers are allocated to a secondary user, the total capacity provided by the spectrum fragment is larger than or equal to remaining requirements of the secondary user; and when (n−1) subcarriers of the spectrum fragment are allocated to the secondary user, the total capacity provided by the spectrum fragment is smaller than the remaining requirements of the secondary user; therefore, the resource allocation element is a resource allocation element selected from the resource allocation vector; if a spectrum fragment includes n subcarriers, when all the n subcarriers are allocated to a secondary user, the total capacity provided by the spectrum fragment is smaller than remaining requirements of the secondary user; or when (n−1) subcarriers of the spectrum fragment are allocated to the secondary user, the total capacity provided by the spectrum fragment is larger than or equal to the remaining requirements of the secondary user; therefore, a matrix element corresponding to the largest value in the resource allocation vector is selected as the resource allocation element.

Optionally, the allocating resources may include: when a difference between the maximum number of spectrum fragments that a current secondary user is allowed to use and the number of spectrum fragments that are already allocated to the secondary user is 1, detecting all other spectrum resources that may be used by the secondary user; and if resources satisfying the requirement of the secondary user exist, selecting and allocating the resources; if resources satisfying the remaining requirement of the secondary user do not exist, releasing resources that are already allocated to the secondary user.

Figure 7:
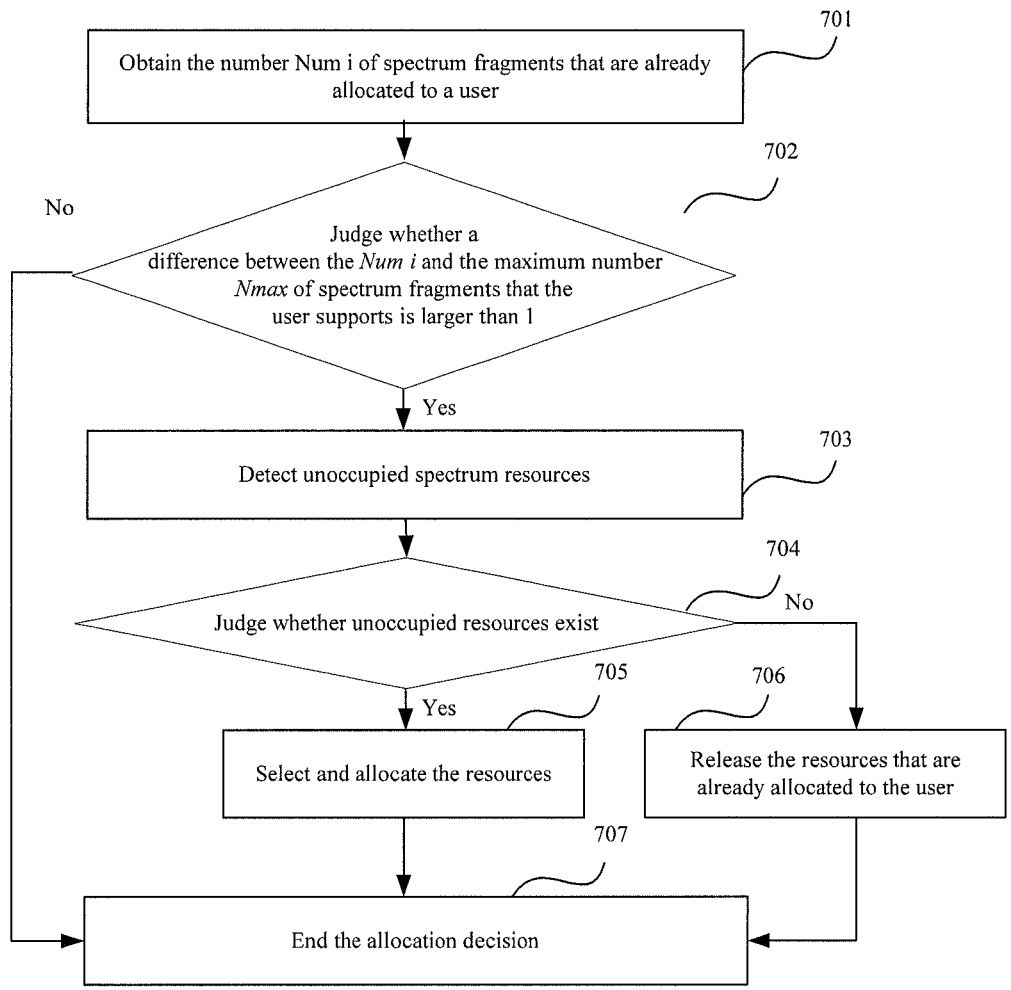
FIG. 7 is a flowchart of a decision made by an allocating unit according to an embodiment of the present invention.

For example, FIG. 7 is a flowchart of a decision made by an allocating unit according to an embodiment of the present invention, including the following steps:

701. Obtain the number Num i of spectrum fragments that are already allocated to a user.

702. Judge whether a difference between the Num i and the maximum number Nmax of spectrum fragments that the user supports is larger than 1; if so, go to step 707; otherwise, go to step 703.

703. Detect unoccupied spectrum resources.

704. Judge whether unoccupied resources exist by using the preceding method for selecting a resource allocation element from the resource allocation vector; if so, go to step 705; otherwise, go to step 706.

705. Select and allocate the resources, and then go to step 707.

706. Release resources that are already allocated to the user, and then go to step 707.

707. End the allocation decision.

If there is a remaining resource allocation element waiting for resource allocation after the resource allocation, remove a resource allocation element that is used in the resource allocation from the solution matrix, and then construct a new solution matrix to continue allocating resources until unoccupied spectrum resources corresponding to the information about unoccupied spectrum fragments are allocated completely or all the secondary users waiting for resource allocation obtain required spectrum resources.

In the preceding technical solutions of the methods provided in embodiments of the present invention, because a technical means of effectively utilizing discrete spectrum fragments in a network of a primary user is adopted, the total capacity of a cognitive radio network system is maximized while the number of spectrum fragments is minimized, which may compensate for a defect of high complexity of an original spectrum allocation solution and support a service of a secondary user having a particular requirement for a bandwidth in the cognitive radio network.

Figure 8:
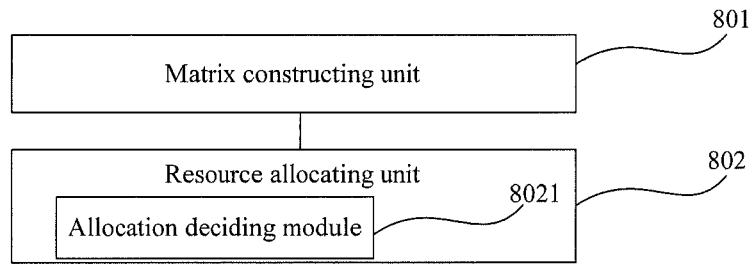
FIG. 8 is a schematic structural diagram of an apparatus for allocating a cognitive radio network spectrum based on aggregation according to an embodiment of the present invention.

Corresponding to the methods provided in embodiments of the present invention, an apparatus for allocating a cognitive radio network spectrum based on aggregation is provided in an embodiment of the present invention. As shown in FIG. 8, the apparatus includes:

a matrix constructing unit 801, configured to obtain information about unoccupied spectrum fragments and unit capacity information of each secondary user on different spectrum fragments, and construct a solution matrix; and a resource allocating unit 802, configured to calculate a reference index corresponding to the solution matrix, determine a resource allocation vector according to the reference index, and allocate resources after selecting a resource allocation element from the resource allocation vector.

If there is a remaining resource allocation elements waiting for resource allocation after the resource allocating unit 802 allocates resources, a resource allocation element that is used in the resource allocation is removed from the solution matrix, and then a new solution matrix is constructed to continue allocating resources until unoccupied spectrum resources corresponding to the information about unoccupied spectrum fragments are allocated completely or all secondary users waiting for resource allocation obtain required spectrum resources.

Optionally, the calculating, by the resource allocating unit 802, the reference index corresponding to the solution matrix may include: calculating a first difference between two largest values of unit capacities that each secondary user is able to obtain on all the unoccupied spectrum fragments in the solution matrix; calculating a second difference between two largest values of unit capacities that each unoccupied spectrum fragment is able to provide to the secondary users waiting for resource allocation in the solution matrix; and using the first difference and the second difference as the reference index corresponding to the solution matrix.

Optionally, the determining, by the resource allocating unit 802, the resource allocation vector according to the reference index may include: selecting a row or a column corresponding to an element whose value is the largest in the reference index as the current resource allocation vector.

Optionally, the selecting, by the resource allocating unit 802, a resource allocation element from the resource allocation vector may include the following: If a spectrum fragment includes n subcarriers, when all the n subcarriers are allocated to a secondary user, the total capacity provided by the spectrum fragment is larger than or equal to remaining requirements of the secondary user; and when (n−1) subcarriers of the spectrum fragment are allocated to the secondary user, the total capacity provided by the spectrum fragment is smaller than the remaining requirements of the secondary user; therefore, the resource allocation element is a resource allocation element selected from the resource allocation vector. If a spectrum fragment includes n subcarriers, when all the n subcarriers are allocated to a secondary user, the total capacity provided by the spectrum fragment is smaller than remaining requirements of the secondary user; or when (n−1) subcarriers of the spectrum fragment are allocated to the secondary user, the total capacity provided by the spectrum fragment is larger than or equal to the remaining requirements of the secondary user; therefore, a matrix element corresponding to the largest value in the resource allocation vector is selected as the resource allocation element.

Optionally, the resource allocating unit 802 may further include an allocation deciding module 8021 configured to make allocation decisions including: When a difference between the maximum number of spectrum fragments that a secondary user is allowed to use and the number of spectrum fragments that are already allocated to the secondary user is 1, detect all other spectrum resources that may be used by the secondary user; and if resources satisfying the requirements of the secondary user exist, select and allocate the resources; if resources satisfying the remaining requirements of the secondary user do not exist, release resources that are already allocated to the secondary user.

In the preceding technical solution of the apparatus provided in the embodiment of the present invention, because a technical means of effectively utilizing discrete spectrum fragments in a network of a primary user is adopted, the total capacity of a cognitive radio network system is maximized while the number of spectrum fragments is minimized, which may compensate for a defect of high complexity of an original spectrum allocation solution and support a service of a secondary user having a particular requirement for a bandwidth in the cognitive radio network.

It is understandable to persons of ordinary skill in the art that all or part of the steps in the methods according to the preceding embodiments may be performed by hardware instructed by a program. The program may be stored in a computer readable storage medium. When the program is executed, all or part of the preceding steps is involved. The storage medium may be a ROM/RAM, a magnetic disk, a CD-ROM, and so on.

The preceding embodiments describe the objectives, technical solutions, and benefits of the present invention in detail. It is understandable that these embodiments are some exemplary embodiments and are not intended to limit the protection scope of the present invention.

What is claimed is:

1. A method for allocating a cognitive radio network spectrum based on aggregation, comprising:

obtaining information about unoccupied spectrum fragments and capacity information, including required capacity, of an unauthorized user on different spectrum fragments, and constructing a solution matrix including the required capacity of the unauthorized user;

calculating a reference index corresponding to the solution matrix, and determining a resource allocation vector according to the reference index and a capacity requirement of an unauthorized user; and allocating resources after selecting a resource allocation element from the resource allocation vector, the calculating of the reference index corresponding to the solution matrix is according to:

calculating a first difference between two largest values of capacities that each unauthorized user is able to obtain on the unoccupied spectrum fragments in the solution matrix, calculating a second difference between two largest values of capacities that each unoccupied spectrum fragment is able to provide to the unauthorized users waiting for resource allocation in the solution matrix, and using the first difference and the second difference as the reference index corresponding to the solution matrix;

the allocating of resources is according to:

when a difference between a maximum number of spectrum fragments that a current unauthorized user is allowed to use and number of spectrum fragments that are already allocated as capacity is 1, detecting other spectrum resources that can be used by the unauthorized user, and if resources satisfying requirements of the unauthorized user exist, selecting and allocating the resources, if resources satisfying remaining requirements of the unauthorized user do not exist, releasing resources that are already allocated to the unauthorized user; and if there is a remaining resource allocation element waiting for resource allocation after the resource allocation, removing a resource allocation element that is used in the resource allocation from the solution matrix, and then constructing a new solution matrix to continue allocating resources until unoccupied spectrum resources corresponding to the information about unoccupied spectrum fragments are allocated or unauthorized users waiting for resource allocation obtain required spectrum resources.

2. The method according to claim 1, wherein the determining the resource allocation vector according to the reference index comprises:

selecting a row or a column of the solution matrix corresponding to an element whose capacity value is largest in the reference index, and using the row or the column as a current resource allocation vector.

3. The method according to claim 1, wherein the selecting a resource allocation element from the resource allocation vector comprises:

selecting from the resource allocation vector a resource allocation element having a total capacity provided by a spectrum fragment which is larger than or equal to remaining requirements of an unauthorized user, when the spectrum fragment comprises n subcarriers and the n subcarriers are allocated to the unauthorized user and a total capacity provided by the spectrum fragment is smaller than remaining requirements of an unauthorized user, when (n−1) subcarriers of the spectrum fragment are allocated to the unauthorized user.

4. The method according to claim 1, wherein the selecting a resource allocation element from the resource allocation vector comprises:

selecting from the resource allocation vector a resource allocation element having a total capacity provided by a spectrum fragment which is smaller than remaining requirements of an unauthorized user, when the spectrum fragment comprises n subcarriers and the n subcarriers are allocated to the unauthorized user and a total capacity provided by the spectrum fragment is larger than or equal to remaining requirements of an unauthorized user, when (n−1) subcarriers of the spectrum fragment are allocated to the unauthorized user.

5. An apparatus for allocating a cognitive radio network spectrum based on aggregation, comprising:

a matrix constructing unit, configured to obtain information about unoccupied spectrum fragments and capacity information, including required capacity, of an unauthorized user on different spectrum fragments, and construct a solution matrix including the required capacity of the unauthorized user; and a resource allocating unit, configured to calculate a reference index corresponding to the solution matrix, determine a resource allocation vector according to the reference index and a capacity requirement of an unauthorized user, and allocate resources after selecting a resource allocation element from the resource allocation vector, the calculating of the reference index corresponding to the solution matrix is according to:

calculating a first difference between two largest values of capacities that each unauthorized user is able to obtain on the unoccupied spectrum fragments in the solution matrix, calculating a second difference between two largest values of capacities that each unoccupied spectrum fragment is able to provide to the unauthorized users waiting for resource allocation in the solution matrix, and using the first difference and the second difference as the reference index corresponding to the solution matrix;

the allocation of resources is according to:

when a difference between a maximum number of spectrum fragments that a current unauthorized user is allowed to use and number of spectrum fragments that are already allocated as capacity is 1, detecting other spectrum resources that can be used by the unauthorized user, and if resources satisfying requirements of the unauthorized user exist, selecting and allocating the resources, if resources satisfying remaining requirements of the unauthorized user do not exist, releasing resources that are already allocated to the unauthorized user; and if there is a remaining resource allocation element waiting for resource allocation after the resource allocation, removing a resource allocation element that is used in the resource allocation from the solution matrix, and then constructing a new solution matrix to continue allocating resources until unoccupied spectrum resources corresponding to the information about unoccupied spectrum fragments are allocated or unauthorized users waiting for resource allocation obtain required spectrum resources.

6. The apparatus according to claim 5, wherein the determining, by the resource allocating unit, the resource allocation vector according to the reference index comprises:

selecting a row or a column of the solution matrix corresponding to an element whose capacity value is largest in the reference index, and using the row or the column as a current resource allocation vector.

7. The apparatus according to claim 5, wherein the selecting, by the resource allocating unit, a resource allocation element from the resource allocation vector comprises:

selecting from the resource allocation vector a resource allocation element having a total capacity provided by a spectrum fragment which is larger than or equal to remaining requirements of an unauthorized user, when the spectrum fragment comprises n subcarriers and the n subcarriers are allocated to the unauthorized user and a total capacity provided by the spectrum fragment is smaller than remaining requirements of an unauthorized user, when (n−1) subcarriers of the spectrum fragment are allocated to the unauthorized user.

8. The apparatus according to claim 5, wherein the selecting, by the resource allocating unit, a resource allocation element from the resource allocation vector comprises:

selecting from the resource allocation vector a resource allocation element having a total capacity provided by a spectrum fragment which is smaller than remaining requirements of an unauthorized user, when the spectrum fragment comprises n subcarriers and the n subcarriers are allocated to the unauthorized user and a total capacity provided by the spectrum fragment is larger than or equal to remaining requirements of an unauthorized user, when (n−1) subcarriers of the spectrum fragment are allocated to the unauthorized user.

\* \* \* \* \*